United States Patent [19]

Smith

[11] Patent Number: 4,618,224

[45] Date of Patent: Oct. 21, 1986

[54] SYSTEM FOR TRANSMITTING A LASER BEAM FROM ONE LOCATION ON AN AIRCRAFT EXTERNALLY TO A REMOTE RECEIVER

[75] Inventor: Eugene A. Smith, Hawthorne, Calif.

[73] Assignee: Northrop Corporation, Hawthorne, Calif.

[21] Appl. No.: 699,704

[22] Filed: Feb. 8, 1985

[51] Int. Cl.⁴ ............................ G02B 5/08; G02B 5/10
[52] U.S. Cl. .................................... 350/618; 350/620; 350/622; 350/623
[58] Field of Search ............... 350/618, 620, 622, 623, 350/605, 632; 362/259; 356/152; 250/201 R, 203 R

[56] References Cited

U.S. PATENT DOCUMENTS

| | | | |
|---|---|---|---|
| 2,993,997 | 7/1961 | McFarlane | 250/203 R |
| 3,723,005 | 3/1973 | Smith et al. | 356/152 |
| 4,024,392 | 5/1977 | Teppo et al. | 350/622 |
| 4,168,123 | 9/1979 | Price | 356/152 |
| 4,277,170 | 7/1981 | Miles | 356/152 |

Primary Examiner—Jon W. Henry
Attorney, Agent, or Firm—Terry J. Anderson; Robert B. Block

[57] ABSTRACT

An aircraft laser system in which a laser beam is generated in one location (e.g. the fuselage) and transmitted via a relay mirror through a window externally of the aircraft structure to a receiver window at another location (e.g. a wing-tip pod). At the receiver, the laser beam passes through the window and is directed by relay mirrors to a turret, the turret receiving and directing the laser beam to an external target.

7 Claims, 6 Drawing Figures

SYSTEM FOR TRANSMITTING A LASER BEAM FROM ONE LOCATION ON AN AIRCRAFT EXTERNALLY TO A REMOTE RECEIVER

BACKGROUND OF THE INVENTION

1. Field of the Invention

The present invention relates to laser systems, particularly aircraft laser systems wherein the laser beam is transmitted externally to a turret mounted to the aircraft, the turret in turn receiving and directing the beam to a target.

2. Description of the Prior Art

The conventional laser system utilizes a laser beam generating device and a pointer/tracker for tracking the target and then directing the laser beam to the target. Pointer/tracker field-of-regard (field-of-regard in the context of the present invention means the solid angle the tracker and target beams can scan without interference with the aircraft structure) requirements typically result in the need to place the pointer/tracker at the extremity of the aircraft, with the beam relayed from a remotely located laser generating device by an optical relay train. In an aircraft, for example, the pointer/tracker is typically mounted in the nose and the laser beam is coupled to the pointer/tracker though an optical relay train which is typically housed in a conditioned tube having a diameter larger than the laser beam and configured to route the beam around structural and equipment obstacles, the approach generally being compatible with all types of fuselage installations. Aircraft wings, and horizontal and vertical tail surfaces, on the other hand, are not as readily usable especially for fighter type aircraft. The reasons for this are that the wing thickness is frequently about the same as the beam tube diameter, especially near the wing tips and the trailing edges of the wing. Thus, wing deflections could prevent the use of a simple point-to-point beam tube since the laser beam could possibly interfere at the wing surface. More complicated optical paths using short beam tube segments may incur unwanted losses at each relay mirror and also require auto-alignment at each mirror position. Other alternatives, such as fiber-optic waveguides, are not suitable for high energy densities due to optical losses, thermal problems and weight. Although thicker or stiffer wing sections may be utilized, these alternatives are not always appropriate for a given aircraft design. Further, optical relay through a wing is frequently impractical due to the presence of landing gear, fuel tanks, actuators and other such elements that require multiple blends in the beam tube.

The pointer/tracker optics are typically mounted in a rotatable device, or turret, which can be incorporated as part of the aircraft as noted hereinabove. In accordance with the above discussion of the existing state of the art, the only alternative to a nose installation is to mount the turret on other areas of the aircraft fuselage. However, the field-of-regard available to the fuselage mounted system can be severely limited by fuselage itself as well as by other elements such as wings and tail surfaces. Therefore, a pointer tracker mounted to the nose would have its field-of-regard limited by both the shape and size of the aft fuselage. Further if the pointer/tracker is mounted on the rear of the fuselage, both the aircraft tail components and engine exhaust could interfere with the field-of-regard.

It has been determined that the field-of-regard available to an aircraft laser system would be greatly increased if the turret could be remotely mounted to a wing pod, for example. An aircraft laser system that would enable a turret to be mounted to the wing-tip, or pod, while avoiding the problem mentioned hereinabove would thus be desirable.

SUMMARY OF THE PRESENT INVENTION

The present invention provides an aircraft laser system wherein a laser beam is generated in one location, typically the aft fuselage of the aircraft, and transmitted from a relay mirror through a window in the fuselage to a window in a remote receiving station such as a wing-tip pod. The beam passes through the receiving window and is received by relay mirrors that route the laser beam to the turret rotably mounted to the pod. The rotation of the turret itself and at least one of the mirrors mounted within the turret directs the laser beam to fields-of-regard typically not available to a turret mounted to the fuselage.

In particular, the present invention provides an arrangement wherein a laser system can be effectively utilized by substantially increasing its field-of-regard. The laser beam is transmitted from the laser device, typically located in the fuselage, the beam being steered by steering mirrors through a beam tube to a fixed window on the fuselage. The output beam is transmitted through the fuselage window and externally of the wing structures to a fixed window formed on the wing-tip pod. A steerable relay mirror in the pod directs the beam to a fixed relay mirror which projects the laser beam onto a fixed mirror mounted within the turret. The laser beam is then reflected from the fixed mirror to a movable mirror to a movable mirror mounted in the turret and rotatable about a first axis, the output beam reflected from the rotatable mirror being directed through a slot formed in the turret such that the beam is projected out into the environment for tracking and pointing purposes. Since the turret is also rotated, a substantially hemispherical field-of-regard is provided. In one embodiment, the optics in the wing pod are arranged such that a fixed focus laser beam is provided at the output of the turret. In a second embodiment, the wing pod optics are arranged so that a variable focused laser beam is provided at the turret output.

The present invention thus provides a relatively simple and cost effective technique for transmitting a laser beam externally of the wing to the turret, the turret receiving and directing the beam to the target in a manner where the field-of-regard of the laser system is substantially increased over existing laser systems, the invention being useful either as part of a laser communication system or a laser weapon system.

BRIEF DESCRIPTION OF THE DRAWING

For a better understanding of the invention, as well as further features and objects thereof, reference is made to the following description which is to be read in conjunction with the accompaying drawing wherein.

DETAILED DESCRIPTION OF THE INVENTION

Figure 1:
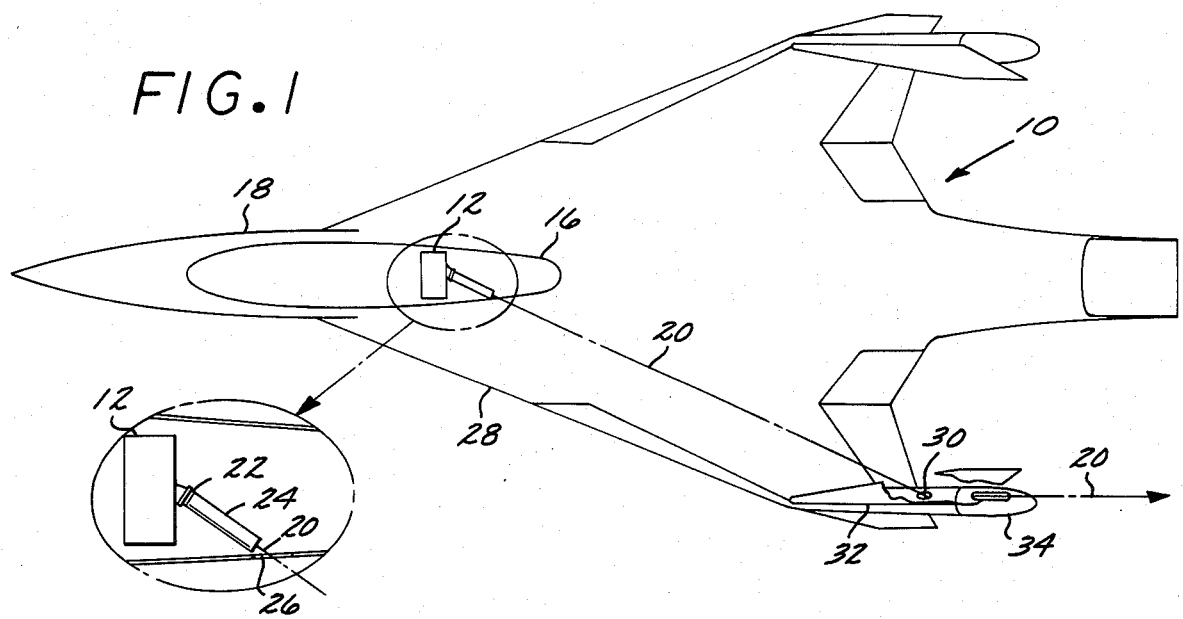
FIG. 1 is a simplified plan view of a fighter aircraft in which the present invention may be utilized.

FIG. 1 illustrates in a simplified format, a plan view of a fighter aircraft 10 in which the device of the present invention may be utilized. In particular, a laser device 12 is positioned within canopy 16 toward the rear of fuselage 18 as illustrated (in this context, canopy 16 may be considered part of fuselage 18). The laser device generates a laser beam 20 which, as shown in the exploded view, is transmitted via a steering mirror 22 through a beam tube 24 to a fixed window 26 formed on canopy 16. The output beam 20 is transmitted externally of the aircraft wing 28 (in essence, beam 20 does not contact aircraft structure between the receiving and transmitting locations) to a receiving window 30 (shown in more detail in FIGS. 2 and 3) formed on the pod 32 at the wing-tip, the beam 20 passing through window 30. The beam 20 is received by relay optics within pod 32 which directs the laser beam to rotating turret 34 mounted to the aft end of wing-tip pod 32 as illustrated. It should be noted that the optical relay can be located within the aircraft structure and the rotating turret at the nose or tail section of the aircraft but for the reasons set forth herein above, it is preferred that the turret be coupled to the wing pod and the optical relay located within the wing pod. From this latter position, the beam 20 can be directed to fields-of-regard not available to a turret which normally would be mounted somewhere on the fuselage 18. Window 26 is configured to provide an unobstructed view of receiving window 30, and window 30 an unobstructed view of window 26. As will be described in more detail with reference to FIG. 6, window 26 is preferably protected on the outside by a movable cover (opened for transmitting beam 20) and a sealed closure on the inside. Similar considerations, including special window cooling systems, may be provided for receiving window 30.

Figure 4:
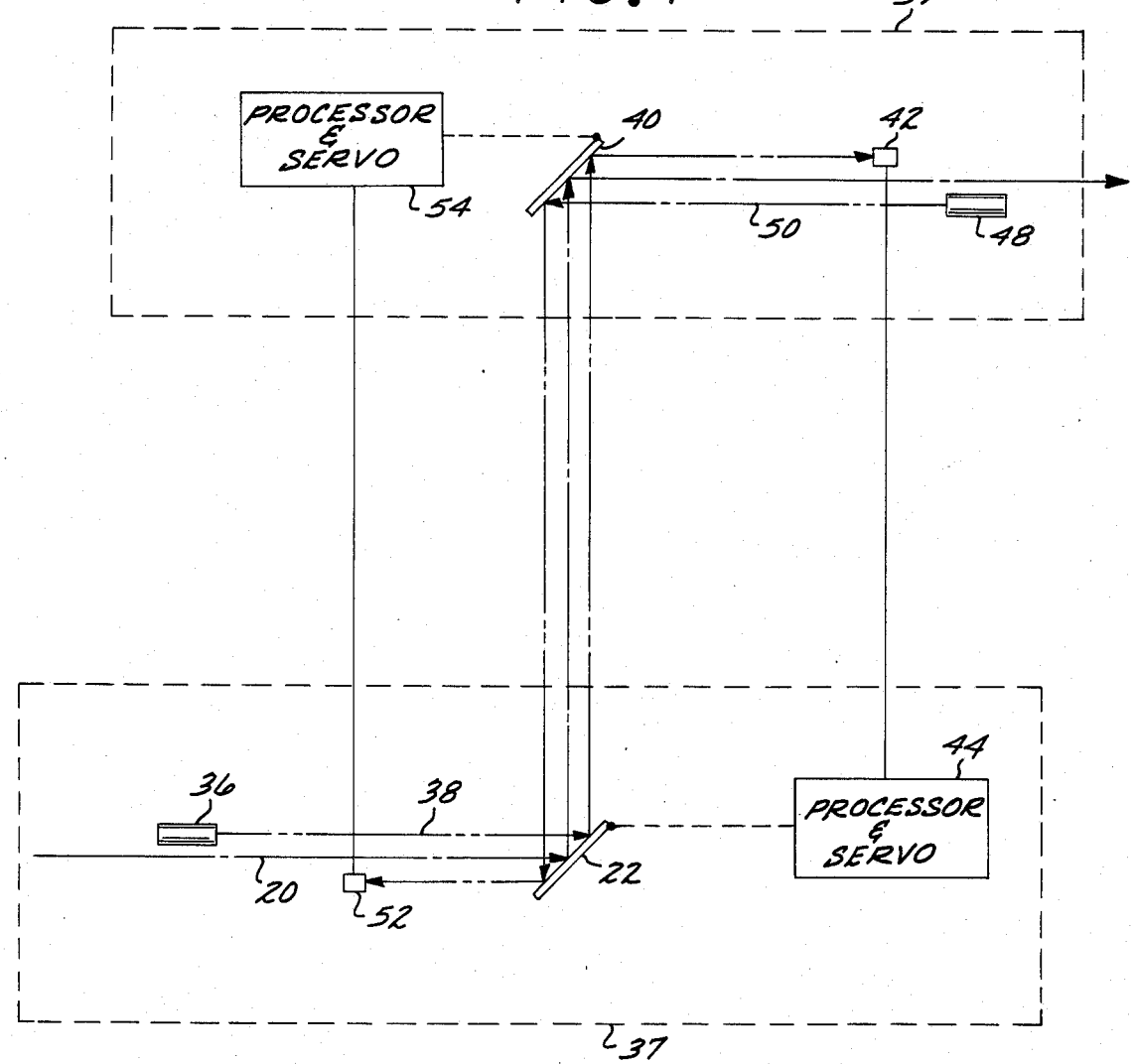
FIG. 4 illustrates a simplified technique for enabling the transmitting and receiving optics to track each other in azimuth and elevation to maintain beam alignment.

Implementation of the concept described with reference to FIG. 1 requires that the transmitting and receiving optics track each other in azimuth and elevation to maintain the beam alignment within the transmitting mirror window 26, the receiving mirror window 30, and the receiving optical relay train to be described hereinafter. Automatic alignment systems are currently available utilizing computers or other processing equipment together with suitable drivers to provide the necessary alignment. A simplified representation of such an alignment system is shown in FIG. 4. In particular, laser beam 20 is incident on the laser mirror 22 as illustrated (the box 37 in phantom represents that the transmitter components shown therein are located in the fuselage 18). In addition, a small alignment laser 36 is also provided and produces a beam 38 which is also incident on the mirror 22. Beam 38 is directed upward by mirror 22 to a steerable relay mirror 40 contained in the wing pod 32 (the box 39 in phantom represents that the receiver components shown therein are all contained in pod 32). Beam 38 is reflected from mirror 40 and directed onto a quadrant detector 42. When beam 20 is in proper alignment with receiver window 30, the detection system is arranged so that when the beam 38 is incident upon the central portion of quadrant detector 42, an electrical output signal from detector 42 is not generated. However, if the beam 38 is incident upon a different portion of detector 42 indicating misalignment, a signal is generated by detector 42 and processor and servo drive device 44 generates a signal to cause steering mirror 22 to be adjusted to provide proper alignment in azimuth and elevation. In a similar manner, an alignment laser 48 can be incorporated in the wing pod 32, laser 48 generating a beam 50 which is reflected off mirror 40 and directed onto mirror 22 which reflects beam 50 to quadrant detector 52. If there is misalignment between the transmitter and receiver windows 26 and 30, respectively, detector 52 will generate a signal to processor and servo device 54 which in turn operates to adjust the mirror 40 to provide the proper alignment.

The size of receiving window 30 is variable and is determined by the degree of beam focus at the transmitter (the output of laser 12), the transmitter pointing accuracy and the relative jitter between the transmitter and the receiver optics (the term transmitter means the elements which provide the beam at window 26 and the term receiver corresponds to the optics in the wing pod 32), the relative jitter including both mechanical jitter and aero-optic jitter during all relevant flight modes.

Laser systems, it is noted, typically utilize both a laser beam for irradiating a target source located, and a separate beam for providing target tracking data. The wavelengths of these two beams are selected to be sufficiently different so that one does not interfere with the other. While a single window material may be suitably transmissive to both wavelengths, other arrangements may require separate windows for tracking and beam projection. The concept of the present invention may be utilized with either window arrangement. It should be noted that the beam and any relay or control optics at the transmitter are enclosed in a sealed housing such as the beam tube 24 set forth hereinabove. The enclosure serves three functions, (1) it provides a clean controlled environment propagating the beam from the beam generator 12 to the output window 26; (2) it encloses the beam to prevent unwanted radiations within the canopy; and (3) it typically supports some of the optics such as those used to route the beam around obstructions. The enclosure is typically filled with pressurized dry nitrogen to insure an outward flow that continually flushes the enclosure and prevents the entry of dust or other contaminants.

Figure 2:
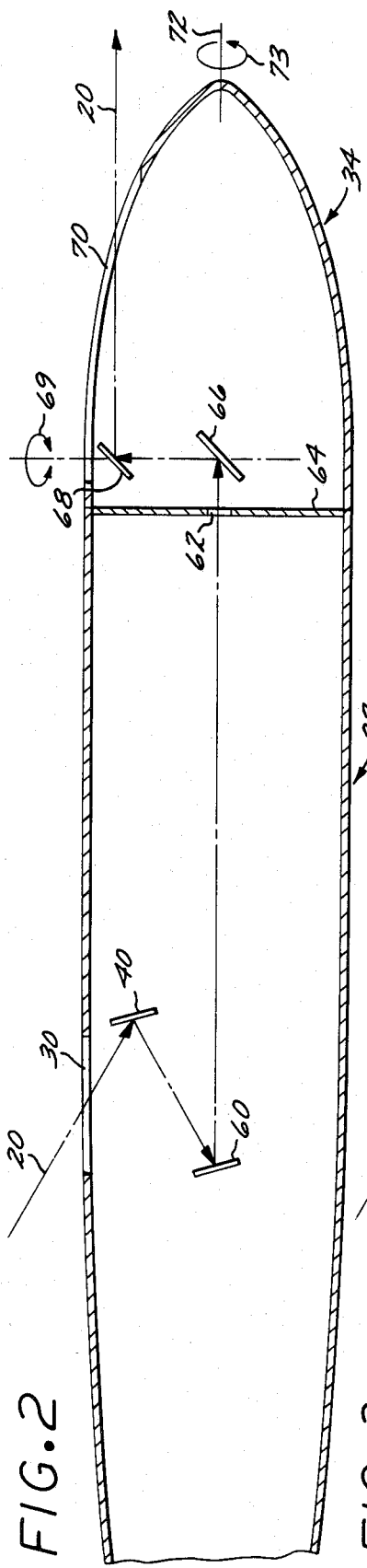
FIG. 2 is a first embodiment of the wing pod/turret optics which provides a focused laser beam at the output of the turret.

One embodiment of the receiver optical relay provided in wing-tip pod 32 utilized in conjunction with the optics in turret 34 is illustrated in FIG. 2. The wing-tip pod/turret arrangement is shown in a simplified view to illustrate the main optical components, the details of the optical mounting devices, which are conventional, not being shown. In particular, the transmitter laser beam 20 is incident on alignment and turning mirror 40 through receiver window 30. The beam is reflected from mirror 40 and directed to an alignment turning mirror 60 which reflects the beam 20 through an aperture 62 formed in a plate 4 which rotatably mounts the wing-tip pod 32 to turret 34. Beam 20 is incident on turning mirror 66 which is fixed to turret 34 and which in turn directs the beam to a movable mirror 68 which is caused to rotate about a transverse axis in the direction of arrow 69 by a mechanism not illustrated. The beam reflected from mirror 68 exits through a slot 70 in the turret and the rotation of the mirror 68 is such to move the beam to provide a substantially 90° field-of-regard. The turret is rotated about longtidinal axis 72 in the direction of arrow 73 by a mechanism not illustrated to provide, together with the angular motion of mirror 68, an essentially hemispherical field-of-regard for the device illustrated. The field-of-regard is essentially free of any interference with the aircraft structure. The embodiment shown in FIG. 2 illustrates an off-axis, fixed focus device.

Figure 3:
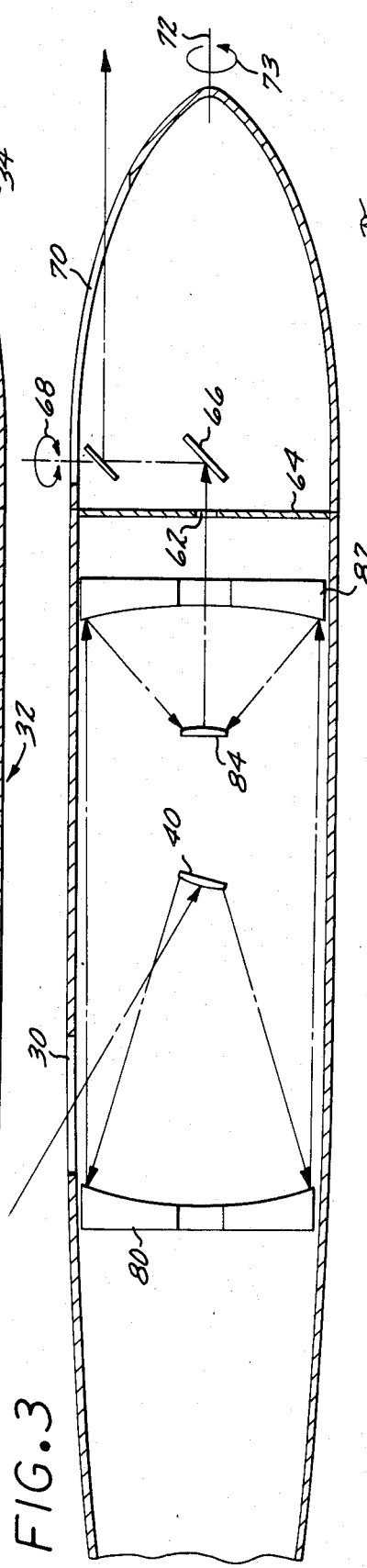
FIG. 3 is a second embodiment of a wing pod/turret optics which provides a focused laser beam at the output of the turret.

Referring now to FIG. 3, a second embodiment of the receiver optical relay provided in wing-tip pod 32 utilized in conjunction with the optics in turret 34 is shown. In particular, beam 20 is incident on steering mirror 40 through the receiving window 30 described previously. The mirror 40, positioned on the longitudinal axis 72 of pod 32 and turret 34, directs an expanding beam onto mirror 80 which directs the expanded beam to a converging type mirror 82. Mirror 82 converges the beam 20 onto a movable mirror 84. Mirror 84 is adapted to be moved by a mechanism (not shown) along axis 72 to provide a means for adjusting the focus of the laser beam 20. The beam 20 is operated upon by the turret optics in a manner described hereinabove with reference to FIG. 2. Thus, the embodiment shown in FIG. 3 provides an additional advantage in that it allows for focusing of the target laser beam 20.

Figure 5:
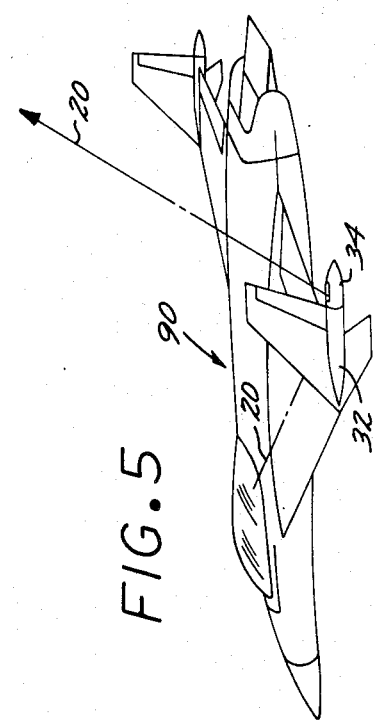
FIG. 5 is a perspective view of an aircraft wherein the remote turret concept of the present invention may be utilized.

FIG. 5 shows a particular application wherein the remote turret 34 as described hereinabove is utilized to provide an aft field-of-regard coverage in a fighter plane 90, particularly a small fighter plane wherein it is generally necessary to maintain transmitter components in the fuselage.

Figure 6:
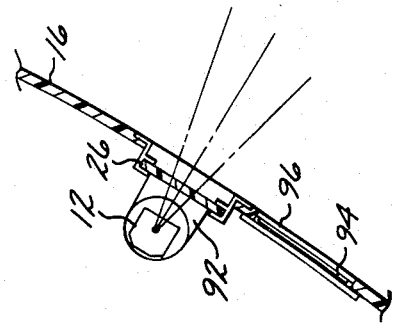
FIG. 6 illustrates a configuration of a transmitter window which may be utilized in the present invention.

FIG. 6 shows a transmitter window 26 configuration which may be utilized in the present invention. In particular, window 26 is supported in sealed housing 92. A sliding window cover 94, supported in housing 96, is provided to protect the window when the laser 12 is not being operated (cover 94 is actually shown in the open, or transmitting position). For a laser 12 operating in the mid-infrared, the canopy 16 is made typically of acrylic, window 26 of calcium fluoride and the window cover/window housing typically of metal or a composite. A similar arrangement can be used for the receiver window 30.

Other window configuration can be utilized. For example, the same basic design of FIG. 6 can be utilized if the window is mounted in the fuselage structure instead of the canopy.

The present invention thus provides an improved laser system for use on aircraft, wherein the field-of-regard for the laser is greatly enhanced by locating the receiving turret on the wing-tip and by transmitting the laser beam externally of the aircraft. The concept described allows for a less complex and lightweight weapons system to be provided, features which are particularly suited for smaller type fighter aircraft by allowing high performance aircraft at a cost effective price to be provided. The present invention is adaptable for use in communication links as well as for weapon systems.

While the invention has been described with reference to its preferred embodiments, it would be understood by those skilled in the art that various changes may be and equivalents may be substituted for elements thereof without departing from the true spirit and scope of the invention. In addition, many modifications may be made to adapt to a particular situation or material to a teaching of the invention without departing from its essential teachings.

What is claimed is:

1. An aircraft having a laser system associated therewith, the aircraft having a fuselage and wings comprising
    a wing tip pod mounted to one of said wings,
    a source of a laser beam mounted on the aircraft at a first location on the fuselage,
    means for tansmitting said laser beam externally of the aircraft from said first location to the wing tip pod, said beam being transmitted directly to said receiving means without interference with the structure of the aircraft,
    receiving means located within said wing tip pod for receiving and redirecting said beam, and including turret means rotatably mounted to the aft of said wing pod, and
    an optical relay train for directing the received beam to said turret means.

2. The aircraft of claim 1 wherein said turret receives said beam from said optical relay train and directs the beam to a remote target through an opening in said turret.

3. The aircraft of claim 2 wherein said optical relay train includes an alignment beam mirror which is positioned a distance away from the longitudinal axis of said pod.

4. The aircraft of claim 2 wherein said optical relay train includes an alignment beam mirror aligned with the longitudinal axis of said pod.

5. The aircraft of claim 4 wherein said optical relay train includes optical means for adjusting the focus of said beam.

6. The aircraft of claim 2 wherein said turret comprises a rotatable mirror, the rotation of said mirror and the turret itself enabling the beam exiting from said opening to have a substantially unobstructed field-of-regard.

7. The aircraft of claim 6 wherein the field-of-regard is approximately $2\pi$ steradians.

* * * * *

UNITED STATES PATENT OFFICE
CERTIFICATE OF CORRECTION

PATENT NO. : 4,618,224
DATED : Oct. 21, 1986
INVENTOR(S) : Eugene A. Smith

It is certified that error appears in the above-identified patent and that said Letters Patent are hereby corrected as shown below:

Column 1, line 51, change "blends"

to --bends--

Column 6, line 22, change "tansmitting"

to --transmitting--

Signed and Sealed this

Tenth Day of March, 1987

*Attest:*

DONALD J. QUIGG

*Attesting Officer*    *Commissioner of Patents and Trademarks*